April 21, 1964 G. G. BAIJLE ETAL 3,130,241
DEHYDROGENATION PROCESS
Filed Dec. 9, 1960
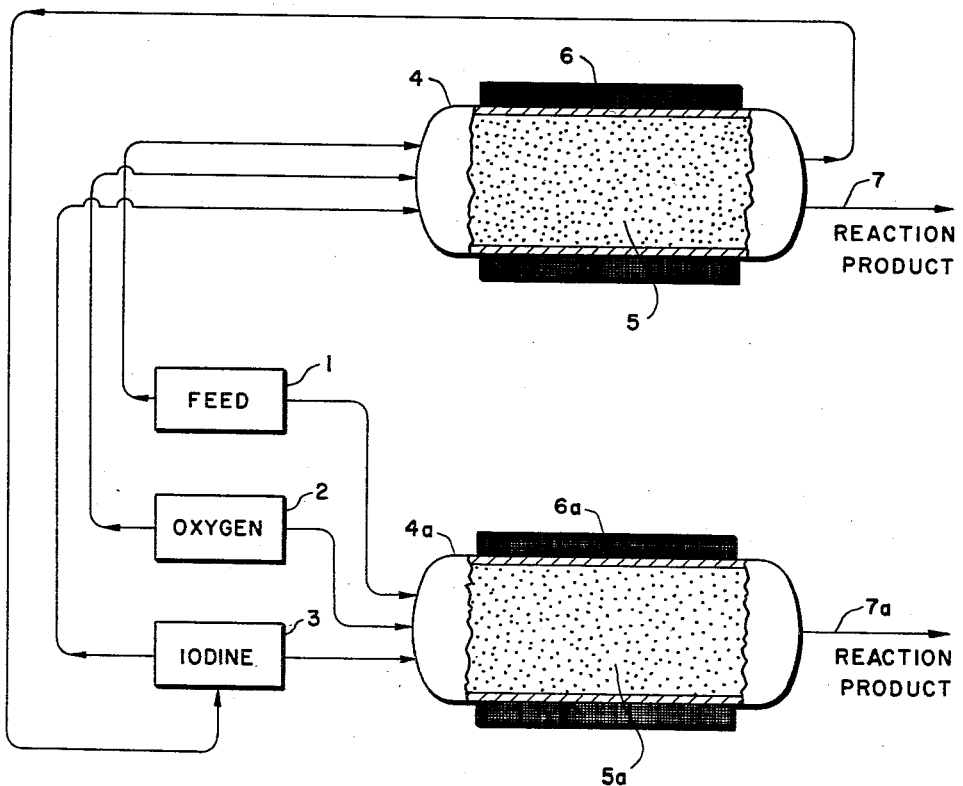
INVENTORS
GERHARD G. BAIJLE
ARIEN KWANTES
BY William H. Myers
THEIR AGENT

United States Patent Office 3,130,241
Patented Apr. 21, 1964

3,130,241
DEHYDROGENATION PROCESS
Gerhard G. Baijle and Arien Kwantes, Amsterdam, Netherlands, assignors to Shell Oil Company, a corporation of Delaware
Filed Dec. 9, 1960, Ser. No. 74,844
Claims priority, application Netherlands Dec. 28, 1959
14 Claims. (Cl. 260—677)

This invention relates to an improved process for the dehydrogenation of organic compounds. It relates more particularly to the dehydrogenation of hydrocarbons to less saturated hydrocarbons, i.e., hydrocarbons having a higher carbon-to-hydrogen ratio. Various methods have been proposed for the dehydrogenation of organic compounds, including simply thermal dehydrogenation and catalytic dehydrogenation as well as chemical reaction with agents which cleave carbon-to-hydrogen bonds and combine with the hydrogen under the reaction conditions to form various stable atom-to-hydrogen bonds, such as oxygen and chlorine and the like. In some instances of chemical or chemical and catalytic dehydrogenation, using oxygen as the dehydrogenating agent, oxygenation of the organic accompanies the dehydrogenation, as in the recently announced process of reacting propene with oxygen in contact with a bismuth molybdate catalyst to form propenal (acrolein).

Among recent developments which have been made in the general process of dehydrogenating organic compounds, there is one in which a mixture of the compound and a substantial proportion of elemental iodine in vapor phase is exposed to a temperature above 300° C. for a relatively short time. British Patent 793,214 describes this class of reaction. These dehydrogenation reactions include, for example, the conversion of paraffins to olefins and diolefins, of olefins to diolefins, of certain paraffins to aromatics (dehydrocyclization) and other reactions in which organic compounds are converted to other compounds having a higher carbon-to-hydrogen ratio, with the simultaneous conversion of iodine to hydrogen iodide. These reactions proceed generally with high efficiency at the preferred reaction conditions. It is possible to reduce materially the amount of elemental iodine that must be charged for the organic reactant by reconverting some of the hydrogen iodide to elemental iodine while it is present in the reaction mixture at reaction conditions. For this purpose, it has been proposed to improve iodine utilization in such a process by adding oxygen together with iodine to the dehydrogenation reaction zone to convert formed hydrogen iodide to iodine and water. However, although the efficiency of iodine utility is increased, the effluent mixture still contains iodine species which causes undesirable reactions unless the effluent mixture is rapidly quenched and requires special handling techniques.

It is the primary object of this invention to provide an improved process for the dehydrogenation of organic substances and especially iodine-effected dehydrogenation, including dehydrocyclization and dehydroisomerization in addition to simple dehydrogenation. It is another object of the invention to provide a process of dehydrogenation with iodine wherein the use of a quench following the reaction is minimized or avoided. It is a further object of the invention to provide such a process promoting a desirable shift in the equilibrium of the reaction mixture.

The invention will be described with particular reference to the figure which illustrates a suitable arrangement of apparatus in which the process of the invention may be conducted.

Now, in accordance with the present invention, an improved process has been provided for the dehydrogenation of organic compounds containing CH groups by means of iodine dehydrogenation, whereby the dehydrogenation is effected in the presence of a hydrogen iodide acceptor. Use is preferably made of metal compounds which yield iodides from which iodine can be recovered by treating with oxygen or oxygen-containing gases in a separate operation. The process is advantageously carried out by passing the organic compound in a gaseous state admixed with iodine through a reaction vessel at least partly packed with the hydrogen iodide acceptor.

Although the exact nature of the reactions involved is not completely understood, the results of studies of the effect of varying different variables such as contact time, relative proportion of iodine, temperature, relative amounts of metal oxide, etc., indicate that at least two different reactions are involved in the process: (A) reaction of free iodine with dehydrogenatable organic substances to form hydrogen iodide and dehydrogenated organic substances and (B) reaction of the hydrogen iodide with the hydrogen iodide acceptor to form a metal iodide. A number of advantages are obtained by the present process. The iodinative dehydrogenation reaction alone is equilibrium limited. Hence, rapid reaction of the hydrogen iodide acceptor shifts the reaction to a higher dehydrogenation conversion of the organic substance. This is particularly valuable for the dehydrogenation of light hydrocarbons wherein the temperatures normally required for high equilibrium conversion are also conducive to thermal cracking. Furthermore, the maintenance of very low concentrations of hydrogen iodide in the reaction zone eliminates, or substantially eliminates, the necessity for a rapid quench of the reactor effluent as well as the recovery of iodine species from relatively dilute aqueous solutions.

In accordance with this invention, the aqueous quench normally employed to minimize undesirable side reactions may be avoided by conducting the dehydrogenation in the presence of a hydrogen iodide acceptor. The purpose of this acceptor is to remove iodine species, by which is meant hydrogen iodide, or elemental iodine, from the system so that they do not further react with the hydrocarbon reaction product and cause undesirable side reactions. Therefore, it is proposed to include in the reaction system a regeneratable metallic oxide which reacts with hydrogen iodide as it is formed presumably according to the following equation:

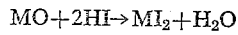

$$MO + 2HI \rightarrow MI_2 + H_2O$$

A specific example of this is the conversion of butanes to butadiene, utilizing a divalent metal oxide such as calcium oxide to form butenes and butadiene, calcium iodide and water. The valency of the metal in the oxide and iodide is not restricted to the divalent metals however. While this removes hydrogen iodide from the system it is then necessary to regenerate iodine therefrom.

According to the present invention the regeneration is performed either in cyclic fashion or at least subsequent to conversion of the acceptor to a metallic iodide according to the following equation:

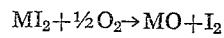

$$MI_2 + \tfrac{1}{2}O_2 \rightarrow MO + I_2$$

Thus, according to the use of such hydrogen iodide acceptors, the following attractive features are provided: (1) For those reactions that are equilibrium limited, the withdrawal of the hydrogen iodide drives the reaction to completion. This is particularly valuable for the dehydrogenation of light hydrocarbons wherein the temperatures required for high equilibrium conversion are also conducive to thermal cracking. (2) The product leaving the above-described reaction system consists entirely of hydrocarbons and water. Thus, the need for a rapid quench zone to prevent undesirable secondary reaction is eliminated. (3) The heat of reaction of the metal oxide-hydrogen iodide reaction compensates for the endothermicity of the dehydrogenation reaction and thus simplifies reactor design.

The hydrogen iodide-binding materials (acceptors) are usually metal compounds, e.g. oxides, hydroxides or carbonates. As a result of reacting with hydrogen iodide these compounds are converted into metal iodides. Use is preferably made of metal compounds which yield iodides from which iodine can be readily recovered by treating with oxygen or oxygen-containing gases in a separate operation. Other hydrogen iodide-binding materials may also be used, however, for instance, ammonia. The amount of acceptor present in the reactor is not critical but should be at least sufficient to accept all hydrogen iodide being produced for a sufficient length of time to minimize recycling of it to a regenerator.

Very good results were obtained when iodine is reacted with hydrocarbons in the presence of oxides or hydroxides of one or more of the following metals: calcium, nickel, zinc, cadmium, indium, tin and the rare earth metals. The iodides of these metals can be very readily converted into oxides by means of oxygen or oxygen-containing gases. When the oxygen treatment is accompanied or followed by a water vapor treatment, the hydroxides may be formed instead of the oxides. In certain cases hydroxides are formed during the dehydrogenation by reaction of the oxides with water vapor formed in situ.

As an example of the reactions involved when butane, iodine and calcium oxide are used as starting materials, reactions are believed to take place according to the following equations:

$$C_4H_{10}+I_2+CaO \rightarrow C_4H_8+CaI_2+H_2O$$
$$C_4H_8+I_2+CaO \rightarrow C_4H_6+CaI_2+H_2O$$

Iodine and calcium oxide are regenerated according to the equation:

$$2CaI_2+O_2 \rightarrow 2CaO+2I_2$$

Use may also be made of compounds of metals which have more than one valency state, the valency decreasing under the conditions of the dehydrogenation reaction and increasing under the conditions of the regeneration. Examples of such compounds are the oxides or iron, cobalt, manganese and copper. When butane, iodine and ferric oxide are used as starting materials the reaction proceed as follows:

$$3C_4H_{10}+2I_2+Fe_2O_3 \rightarrow 3C_4H_8+2FeI_2+3H_2O$$
$$3C_4H_8+2I_2+Fe_2O_3 \rightarrow 3C_4H_6+2FeI_2+3H_2O$$

It may be imagined that HI is first formed by dehydrogenation of the hydrocarbon with the iodine and that this HI is then partly oxidized to $I_2$ by $Fe_2O_3$, FeO also being formed which yields $FeI_2$ with remaining HI. Hence, the iodine is in this case partly regenerated in situ. There is a possibility of their remaining some FeO which is not converted into $FeI_2$.

$Fe_2O_3$ is regenerated according to the equation:

$$4FeI_2+3O_2 \rightarrow 2Fe_2O_3+4I_2$$

The oxides which, like $Fe_2O_3$, also may have an oxidizing effect and may cause undesirable side-reactions, thereby wholly or partly destroying the desired dehydrogenated hydrocarbon. Such side-reactions may be suppressed by mixing the metal oxide with alkali metal, alkaline earth metal and/or ammonium compounds, in particular oxides, hydroxides, carbonates and halides of the alkali metals, for example sodium oxide, potassium oxide and potassium iodide.

Metal compounds binding hydrogen iodide may also be salts which react with hydrogen iodide, with the formation of an acidic oxide, when iodides are formed which by treatment with oxygen and the acidic oxide may be reconverted into the original salts. Examples are the carbonates or bicarbonates of lithium, sodium, potassium and strontium in particular, and also the carbonates or bicarbonates of rubidium, cesium, barium, tallium, and germanium. When the starting materials are, for example, butane and potassium carbonate, the dehydrogenation reaction should proceed according to the following equations:

$$C_4H_{10}+I_2+K_2CO_3 \rightarrow C_4H_8+2KI+CO_2+H_2O$$
$$C_4H_8+I_2+K_2CO_3 \rightarrow C_4H_6+2KI+CO_2+H_2O$$

and the regeneration according to:

$$4KI+O_2+2CO_2 \rightarrow 2K_2CO_3+2I_2$$

Where reference is made herein to metal oxides, in certain cases metaloxy-iodides may also be used as hydrogen iodide-binding materials instead of these oxides or in addition thereto. On the other hand, it is also possible for metaloxy-iodides to be formed instead of metal iodides or in addition thereto in the dehydrogenation reaction.

For bringing together the hydrocarbon to be dehydrogenated, iodine and hydrogen iodide-binding materials various order of mixing may be used. It is possible, for example, first to mix the hydrocarbon with iodine and to contact the resultant mixture with the hydrogen iodide-binding material either immediately or after a certain degree of dehydrogenation has taken place. Hydrocarbon, iodine and hydrogen iodide-binding material may each be introduced into the reaction mixture either at once or gradually.

As a rule the hydrogen iodide-binding materials, in particular metal oxides, will be present in the reaction mixture in solid form, for example as a fixed or fluidized bed. The process, may, however, also be carried out very well with hydrogen iodide-binding materials in the liquid state, e.g. present in the form of a melt. If desired, materials may be added which do not themselves bind hydrogen iodide, but which yield at the temperature prevailing in the reactor a solution or melt with the hydrogen iodide-binding material or materials present. The iodides formed may in some cases also form a melt with the oxides.

If desired, the hydrogen iodide-binding materials may be used together with carriers which are inert per se, such as alumina, magnesia and silica. In such a case the hydrogen iodide-binding material will usually be brought on to the surface of the carrier in a finely divided state. Suitable carriers are porous materials in particular.

Oxygen may, if desired, be incorporated in the mixture in which the dehydrogenation is to take place. This oxygen may contribute to the dehydrogenation and is bound to the hydrogen split off from the hydrocarbon. This hydrogen is probably intermediately bound to iodine. Larger amounts of oxygen, however, cause difficulties.

It is also possible to incorporate substances giving off oxygen into the reaction mixture. Moreover, a related possibility is that in addition to the hydrogen iodide-binding material a compound is present which does not bind hydrogen iodide but only oxidizes it. This compound may be molybdenum oxide, for example. If desired, the mixture of hydrocarbon and iodine may be successfully passed through two reactors one of which contains the oxidizing agent and the other the hydrogen iodide-binding material.

It is advisable to use the hydrogen iodide-binding material in excess of the hydrocarbon to be dehydrogenated and iodine. The hydrocarbon and iodine may be mixed in a stoichiometric ratio or else in such ratios that after completion of the reaction either hydrocarbon or iodine remains behind. The iodine remaining in such a case may be bound by addition of another hydrocarbon which is partly dehydrogenated as well, preferably one which can be readily separated from the hydrocarbon to be prepared, for example by making use of a difference in boiling points.

The temperatures at which hydrocarbons are dehydrogenated and iodine is regenerated are usually in the range of from 300° C. to 700° C., usually 400 to 600° C. In certain cases temperatures lower than 300° C. may, however, also lead to favorable results, particularly in the regeneration reaction (for example 150–300° C.). The pressure employed may be atmospheric pressure, although higher or lower pressures may also be used.

The invention will be more clearly understood by reference to the figure which shows a typical apparatus in which the described process may be carried out. According to the figure, a feed hydrocarbon from a source 1 and iodine from a source 3 are conducted into a reaction vessel 4 which is packed with a hydrogen iodide acceptor 5. The reaction vessel is preferably surrounded by a heat control element 6. Under the influence of heat in the reaction vessel the iodine and the feed hydrocarbon react to form a second hydrocarbon having a higher carbon-to-hydrogen ratio and hydrogen iodide. The later reacts with the hydrogen iodide acceptor and the hydrocarbon reaction product is removed by means of line 7. Substantially all (or any desired proportion) of the hydrogen iodide acceptor is converted to the corresponding metallic iodide at which point operation is switched from the assembly of elements 4, 5, 6 and 7 to the corresponding assembly 4a, 5a, 6a and 7a. The metallic iodide in the first vessel is then regenerated such as by introducing oxygen from a source 2 for the conversion of the metallic iodide to elemental iodine and the corresponding metallic compound acting originally as the hydrogen iodide acceptor. The iodine so regenerated may be recycled to the iodine storage source 3 for reuse in the process.

The organic material to be dehydrogenated may be a hydrocarbon or it may contain a hydrocarbyl group together with one or more other atom species such as oxygen or nitrogen, as in esters, ketones, nitriles, etc. Thus, saturated aliphatic compounds include acyclic and alicyclic hydrocarbons which may be dehydrogenated to the corresponding unsaturates, which may be monoolefinic, diolefinic, polyolefinic and acetylenic, depending on the relative proportions of reactants, the particular conditions of temperature, pressure and contact time employed and the particular hydrocarbon used. It is unnecessary to start with fully saturated materials since partially unsaturated hydrocarbons may be further converted to form di- or polyunsaturates. For example, butene-1 and butene-2 yield butadiene-1,3; isobutane yields isobutylene; n-butane yields a mixture of butenes and butadienes; isopentane yields a mixture of isopentenes and isoprene; propane yields propylene; ethane yields ethylene; cyclopentane yields cyclopentene and cyclopentadiene; methylcyclopentene yields methylcyclopentadiene; cyclohexane yields largely cyclohexatriene-1,3,5(benzene); n-hexane yields hexenes, hexadienes and benzenes; n-heptane and iso-heptane yield toluene; 2,5-dimethylhexane yields para-xylene; 2,4-dimethylhexane yields m-xylene.

The dehydrogenatable hydrocarbons may contain aromatic portions attached to a dehydrogenatable aliphatic group, such as an aryl alkane including aryl cycloalkanes.

The invention is, for example, particularly suitable for the following conversion reactions:

Methane to acetylene and ethylene
Ethane to ethylene and acetylene
Ethylene to acetylene
Propane to propylene
Methylacetylene to allene Although the reaction of hydrocarbons with iodine is highly selective, differences have been observed between various hydrocarbons, both in the rate of reaction and in the selectivity to a particular compound. Thus, the rate at which olefins are converted to compounds having a higher degree of unsaturation (either diolefins or other olefinic compounds or aromatics) is considerably greater, often by a factor of 10 or more, than the rate of reaction of paraffins of the identical skeleton at otherwise equal conditions. It has also been found that the ideal length of the chain of contiguous non-quaternary carbon atoms in the aromatization of aliphatic compounds by dehydrocyclization is from 6 to 7 carbon atoms for the most efficient conversion. When longer chains are aromatized the product contains not only aromatics of the same number of carbon atoms but also appreciable amounts of lower aromatics, formed by splitting off of short fragments, e.g., methyl or ethyl groups. Except for this latter effect of losing short fragments from aromatics, the reactions of the present invention are highly selective in producing a product having the same number of carbon atoms as the charge hydrocarbon. Thus, the present invention is not concerned with the promotion of the cracking of hydrocarbons.

The feed charged to the reaction mixture may be a pure iodine-reactive hydrocarbon or it may be an iodine-reactive hydrocarbon in admixture with different iodine-reactive hydrocarbons, or it may be an iodine-reactive hydrocarbon in admixture with inert compounds. An inert comopud, for example, is benzene or naphthalene, which is not converted in any manner under the conditions of this invention.

*Example I*

Butane was dehydrogenated in a quartz tube 25 cm. long and having a cross-sectional area of 0.9 square cm. The tube was vertically arranged in a controllable electric furnace.

The bottom 10 cm. of the tube were packed with $Fe_2O_3$ impregnated with KI (7.2 g. of $Fe_2O_3$, 2.8 g. of KI). The mixture was granulated into 0.5–2 mm. pieces. The top of the tube was filled with pieces of porcelain.

The temperature in the $Fe_2O_3$ was 530° C. A mixture consisting of 0.77 liter butane, 2.45 liters nitrogen and 4.4 g. iodine was passed through the top to the bottom over a period of 50 minutes. This mixture entered the tube at a temperature of 300° C. and was then preheated in the porcelain packing to 530° C.

From the composition of the gas mixture leaving the bottom of the tube, it was found that 18 percent of the butane had been converted into butenes, 29 percent into butadiene, 41 percent unconverted, 8 percent was cracked and 4 percent was converted into CO, $CO_2$ and water. No iodine was observed in this gas mixture.

By heating the packing of the bottom part of the tube after completion of this test in an air stream at 600° C. the iodine incorporated therein was entirely recovered.

*Example II*

Except for the differences referred to below, this example is identical with Example I.

Instead of $Fe_2O_3$ impregnated with KI, pure $Fe_2O_3$ was used (10 grams). The temperature in the bottom part of the tube averaged 550° C. A mixture of 0.89 liter butane, 2.63 liters nitrogen and 11 grams of iodine was passed through over a period of 1 hour.

Of the butane 43 percent was converted into butenes and 6 percent into butadiene. In addition, 19 percent was cracked and 13 percent converted into CO, $CO_2$ and water. 19 percent was unchanged. No iodine was present in the gas mixture leaving the reactor.

*Example III*

The apparatus was the same as in Example I. The tube was packed over a length of 20 cm. with 23 grams of CaO in 0.5–2 mm. pieces.

The temperature in the bottom part of the tube averaged 520° C. A mixture of 0.93 liter butane, 2.54 liters nitrogen and 16 grams of iodine was passed through the tube from top to bottom over a period of 62 minutes.

The iodine was fully bound to $CaI_2$ by CaO.

Of the butane 8 percent was converted into butenes and 72 percent into butadiene. 15 percent was unchanged.

2 percent was cracked and 3 percent converted into CO, $CO_2$ and water.

CaO was regenerated as in Example I. The regenerated CaO was used again in the dehydrogenation. In this manner ten cycles were performed with the same material without there being any significant difference in the results.

*Example IV*

In this example 6 grams of CaO supported on 12 grams of carrier were used. As such sintered kieselguhr ("Sil-O-Cel") was used having a particle size of 0.2–0.5 mm.

The temperature in the bottom part of the tube (equipment as in Example I) averaged 515° C. A mixture of 1.13 liters butane, 2.66 liters nitrogen and 11 grams iodine was passer through from top to bottom over a period of 65 minutes.

The iodine was entirely taken up by the CaO.

Of the butane 18 percent was converted into butenes and 26 percent into butadiene, 49 percent was unchanged, 3 percent was cracked and 4 percent converted into CO, $CO_2$ and water.

The regeneration was effected as in Example I.

*Example V*

The reactor was a quartz tube having a volume of 200 ml. and a length of 25 cm.

The reactor was packed with 18.1 grams NiO supported on 80.1 grams of pumice stone. The temperature in the reactor was varied from 450° to 540° C. in ten successive cycles.

In each cycle 3.8 liters of butane and 58.3 grams of iodine were passed through in 52 minutes (not nitrogen).

In all cycles the iodine was substantially entirely bound. Regeneration was carried out with air at the same temperatures as dehydrogenation.

The results were substantially the same in all cycles.

In the cycle which was carried out at 510° C., 39 percent of the butane was converted into butenes and 48 percent into butadiene, 9 percent remaining unchanged, 2 percent being cracked and 2 percent destroyed by oxidation.

We claim as our invention:

1. In a process for the iodinative dehydrogenation of a first hydrocarbon to a second hydrocarbon having a higher carbon-to-hydrogen ratio by reacting said first hydrocarbon with iodine at a temperature in excess of 300° C. whereby hydrogen iodide is formed from hydrogen removed from said first hydrocarbon, the improvement comprising conducting said dehydrogenation with reacting gases consisting essentially of hydrocarbon and iodine, in the presence of a metal compound as hydrogen iodide acceptor, said acceptor being present in an amount to accept substantially all of the hydrogen iodide being formed in the dehydrogenation, and separating said second hydrocarbon from the resulting metallic iodide.

2. A process according to claim 1 wherein the acceptor is a metal compound forming metallic iodides from which iodine can be recovered by oxidation.

3. A process according to claim 2 wherein the acceptor is a compound of the group consisting of oxides, hydroxides, carbonates, bicarbonates and mixtures thereof.

4. A process according to claim 3 wherein the oxides and hydroxides are those of a metal of the group consisting of Ca, Ni, Zn, Cd, In, Sn, rare earth metals and mixtures thereof.

5. A process according to claim 3 wherein the carbonates and bicarbonates are those of a metal of the group consisting of iron, cobalt, manganese, copper and mixtures thereof.

6. A process according to claim 1 wherein the acceptor is a metal oxide of metals having more than one valency state.

7. A process according to claim 6 wherein the acceptor is modified by the additional presence of a compound of the group consisting of oxides, hydroxides, carbonates and halides of alkali metals, alkaline earth metals and mixtures thereof.

8. A process in accordance with claim 1 wherein the first hydrocarbon is butane and the second hydrocarbon comprises butene and butadiene.

9. In a process for the iodinative dehydrogenation of a first hydrocarbon by feeding to a reaction zone maintained at a temperature in excess of 300° C. reactants consisting of hydrocarbon and iodine, whereby a second hydrocarbon having a higher carbon-to-hydrogen ratio than said first hydrocarbon is produced together with hydrogen iodide formed from hydrogen removed from said first hydrocarbon, the improvement comprising conducting the dehydrogenation in the presence of a solid metal compound as hydrogen iodide acceptor, said acceptor being present in an amount to accept substantially all of the hydrogen iodide being formed in the dehydrogenation, and separating said second hydrocarbon from the resulting metal iodide.

10. Process in accordance with claim 9 wherein the acceptor is a metal oxide.

11. Process in accordance with claim 9 wherein the hydrogen iodide acceptor is present in the reaction zone in the form of a fluidized bed.

12. Process in accordance with claim 9 wherein the hydrogen iodide acceptor is present in the reaction zone in a finely divided state on the surface of an inert carrier material.

13. Process in accordance with claim 9 wherein the first hydrocarbon and iodine are passed into the reaction zone at the top thereof for downward passage therethrough with periodic regeneration of the resulting hydrogen iodide and acceptor reaction product with a heated air stream to regenerate free iodine and acceptor.

14. In a process for the iodinative dehydrogenation of a first hydrocarbon to a second hydrocarbon having a higher carbon-to-hydrogen ratio by reacting said first hydrocarbon with iodine at a temperature in excess of 300° C., whereby hydrogen iodide is formed from hydrogen removed from said first hydrocarbon, the improvement comprising (1) carrying out said dehydrogenation by feeding reactants consisting of hydrocarbon and iodine into contact with a metal compound as hydrogen iodide acceptor, said acceptor being present in an amount to accept substantially all of the hydrogen iodide being formed in the dehydrogenation zone, (2) separating the hydrocarbon product of the reaction from the metal iodide resulting from reaction of the hydrogen iodide with said acceptor, (3) separately treating the separated metal iodide with oxygen-containing gas to liberate free iodine therefrom and regenerate said hydrogen iodide acceptor, and (4) reusing the liberated iodine and regenerated hydrogen iodide acceptor in the dehydrogenation zone to produce an additional amount of said second hydrocarbon product.

References Cited in the file of this patent

UNITED STATES PATENTS

| | | |
|---|---|---|
| 2,879,300 | Cheney et al. | Mar. 24, 1959 |
| 2,898,386 | Raley et al. | Aug. 4, 1959 |
| 2,901,520 | Raley et al. | Aug. 25, 1959 |
| 2,921,013 | Mullineaux et al. | Jan. 12, 1960 |
| 3,080,435 | Nager | Mar. 5, 1963 |

OTHER REFERENCES

Mellor: "Comprehensive Treatise on Inorganic and Theoretical Chemistry," Longmans, Green & Co., New York, 1922, vol. 2, pp. 203–7.